United States Patent
Wang et al.

(10) Patent No.: US 11,651,225 B2
(45) Date of Patent: May 16, 2023

(54) NON-UNIFORM REGULARIZATION IN ARTIFICIAL NEURAL NETWORKS FOR ADAPTABLE SCALING

(71) Applicant: Mitsubishi Electric Research Laboratories, Inc., Cambridge, MA (US)

(72) Inventors: Ye Wang, Cambridge, MA (US); Toshiaki Koike-Akino, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 410 days.

(21) Appl. No.: 16/866,775

(22) Filed: May 5, 2020

(65) Prior Publication Data

US 2021/0350239 A1     Nov. 11, 2021

(51) Int. Cl.
  *G06N 3/08*     (2023.01)
  *G06N 3/02*     (2006.01)
  *G06N 3/082*    (2023.01)
  *G06K 9/62*     (2022.01)
  *G06N 3/04*     (2023.01)

(52) U.S. Cl.
  CPC .......... *G06N 3/082* (2013.01); *G06K 9/6232* (2013.01); *G06N 3/0454* (2013.01)

(58) Field of Classification Search
  CPC ................................................ G06N 3/082
  See application file for complete search history.

(56) References Cited

U.S. PATENT DOCUMENTS

| 2019/0095798 A1* | 3/2019 | Baker ................. G06N 3/0445 |
| 2020/0134461 A1* | 4/2020 | Chai ...................... G06N 3/088 |

OTHER PUBLICATIONS

Andrew Ng, "CS294A Lecture notes," Handout #2: Lecture Notes on Sparse Autoencoders (pdf) (Updated 10:00pm, Jan. 11, 2011 to fix first and second equation on p. 16.).

(Continued)

*Primary Examiner* — Ross Varndell
(74) *Attorney, Agent, or Firm* — Gennadiy Vinokur; Hironori Tsukamoto

(57) ABSTRACT

A system for flexible regularization and adaptable scaling of an artificial neural network is provided. The system includes a memory to store an artificial neural network and training data, a processor and interface to submit signals and training data into the neural network having a sequence of layers, each layer includes a set of neuron nodes, wherein a pair of nodes from neighboring layers are mutually connected with a plural of trainable parameters to pass the signals from the previous layer to next layer, a random number generator to modify the output signal of each neuron nodes for regularization in a stochastic manner following a multi-dimensional distribution across layer depth and node width directions of the neural network, wherein at least one layer has non-identical profile across neuron nodes, a training operator to update the neural network parameters by using the training data such that the output of neural network provides better values in a plural of objective functions; and an adaptive truncator to prune the output of neuron nodes at each layer in a compressed size of the neural network to reduce the computational complexity on the fly in downstream testing phase for any new incoming data.

13 Claims, 10 Drawing Sheets

(56) References Cited

OTHER PUBLICATIONS

Ravi Palanki and Jonathan S. Yedidia, "Rateless Codes on Noisy Channels." First printing, Oct. 2003. 2. Minor corrections, Nov. 2003. 3. More minor corrections, Apr. 2004. 4. See also MERL TR2004-037 for a shorter version of this technical report published in the Proceedings of the Conference on Information Sciences and Systems, 2004.

Van der Maaten et al. "Dimensionality Reduction: A Comparative Review." Copyright Laurens van der Maaten, Eric Postma, and Jaap van den Herik 2009. Tilburg centre for Creative Computing P.O. Box 90153 Tilburg University 5000 LE Tilburg, The Netherlands http://www.uvt.nl/ticc Email: ticc@uvt.nl.

Vincent et al. "Stacked Denoising Autoencoders: Learning Useful Representations in a Deep Network with a Local Denoising Criterion." Journal of Machine Learning Research 11 (2010) 3371-3408 Submitted May 2010; Published Dec. 2010.

D.J.C. MacKay, "Capacity Approaching Codes Design and Implementation Special Section" IEE Proc.-Commun., vol. 152, No. 6, Dec. 2005. pp. 1062-1068.

Giraldo et al., "Rate-Distortion Auto-Encoders." Dec. 31, 2013ICLR 2014 conference submission.

Hinton et al. "Improving neural networks by preventing co-adaptation of feature detector." Neural and Evolutionary Computing (cs.NE); Computer Vision and Pattern Recognition (cs.CV); Machine Learning (cs.LG). [Submitted on Jul. 3, 2012].

Scholz M., Fraunholz M., Selbig J. (2008) Nonlinear Principal Component Analysis: Neural Network Models and Applications. In: Gorban A.N., Kégl B., Wunsch D.C., Zinovyev A.Y. (eds) Principal Manifolds for Data Visualization and Dimension Reduction. Lecture Notes in Computational Science and Enginee, vol. 58. Springer, Berlin, Heidelberg. https://doi.org/10.1007/978-3-540-73750-6_2.

Hinton et al., "Reducing the Dimensionality of Data with Neural Networks." Jul. 28, 2006 vol. 313 Science pp. 505-508.

\* cited by examiner

Bottleneck AE

Sparse AE

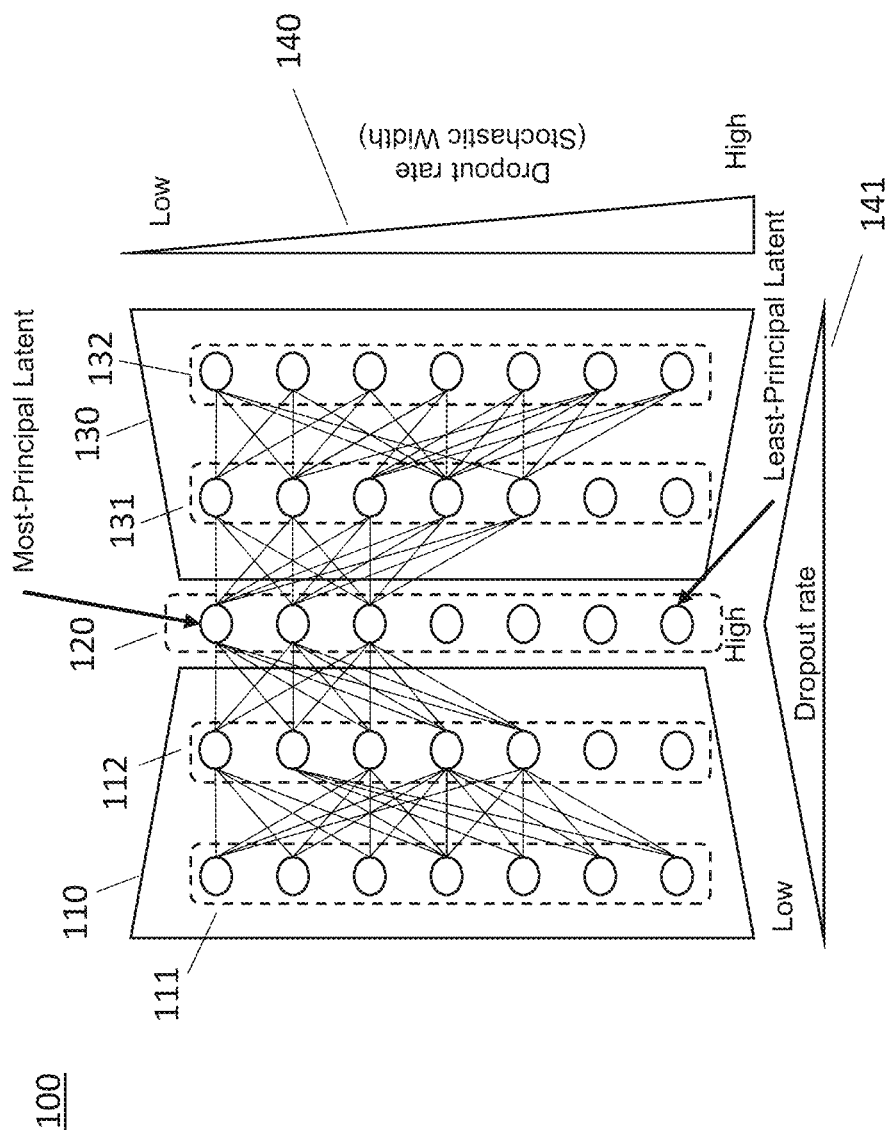

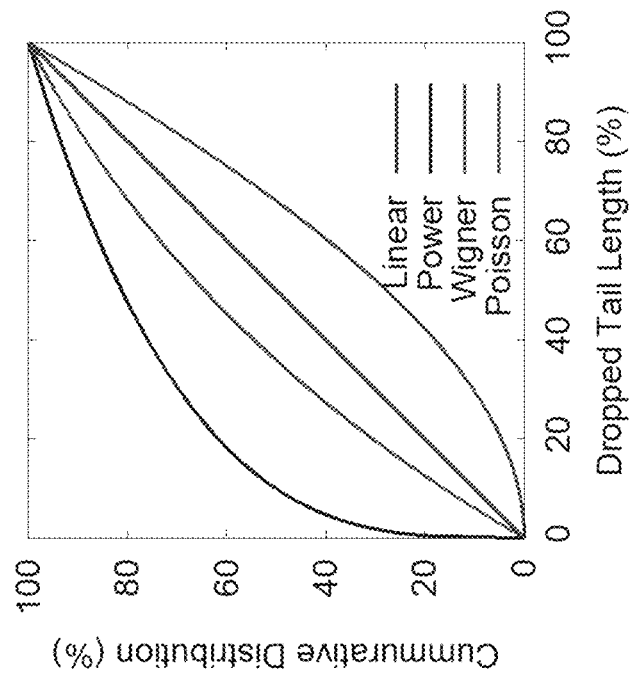
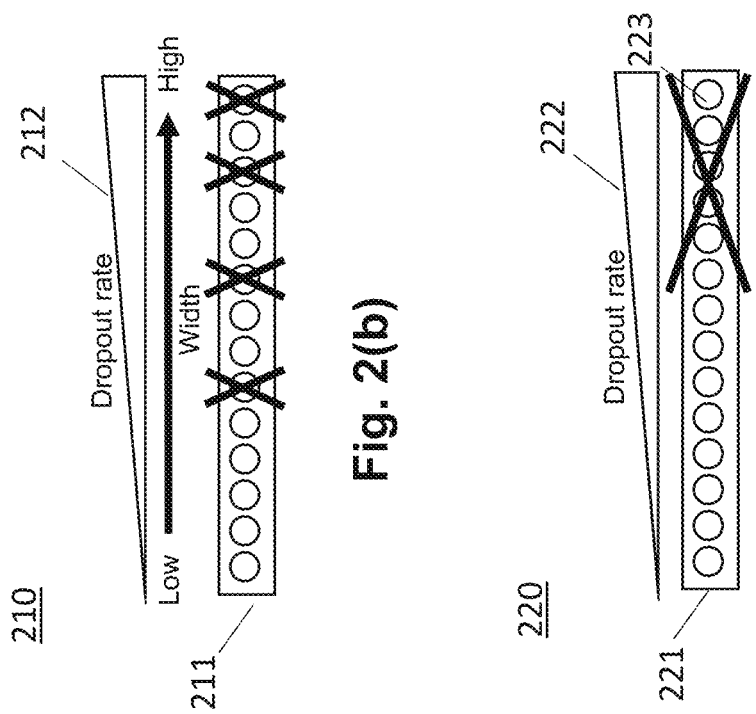

Fig. 5(a) Deterministic bottleneck

Fig. 5(b) Stochastic bottleneck

NON-UNIFORM REGULARIZATION IN ARTIFICIAL NEURAL NETWORKS FOR ADAPTABLE SCALING

TECHNICAL FIELD

This invention relates generally to an artificial neural network system and a method for designing a neural network, and particularly to non-uniform dropouts in neural networks for achieving flexible regularization and adaptable dimensionality reduction.

BACKGROUND

Feature extraction and dimensionality reduction are important before data analysis and communications. In many real-world applications, the raw data measurements (e.g., audio/speech, images, video, and biological signals) often have very high dimensionality. Adequately handling high dimensionality often requires the application of dimensionality reduction techniques that transform the original data into meaningful feature representations of reduced dimensionality. Such feature representations should reduce the dimensionality to the minimum number required to capture the salient properties of the data. Dimensionality reduction is important in many machine learning and artificial intelligence applications, since one needs to mitigate the so-called curse of dimensionality, which refers to the problematic phenomenon of exponentially increasing dimensionality in data analysis. To date, there have existed many algorithms for dimensionality reduction, e.g., principal component analysis (PCA), kernel PCA, Isomap, maximum variance unfolding, diffusion maps, locally linear embedding, Laplacian eigenmaps, local tangent space analysis, Sammon mapping, locally linear coordination and manifold charting. In the past few decades, latent representation learning based on artificial neural networks (ANNs) called auto-encoders (AEs) has been widely used for dimensionality reduction, since this nonlinear technique has shown superior real-world performance compared to classical linear counterparts, such as PCA.

One of the challenges in dimensionality reduction is to determine the optimal latent dimensionality that can sufficiently capture the data features required for particular applications. Although some regularization techniques, such as sparse AE (SAE) and rate-distortion AE, may be useful to adjust the effective dimensionality, there are no existing methods that provide an adaptability, that allows for seamless adjustment of the latent dimensionality depending on varying distortion requirements for different downstream applications, without modification of the trained AE model. Some existing works impose conditional AE training in a hierarchal architecture, and progressive stacking. However, these prior approaches require cumbersome re-training for multiple times. Accordingly, existing AEs typically have a drawback that the latent variables are equally important, unlike linear PCA offers ranked latent variables.

Analogous to the issue of determining the size of latent variables, determining the size of artificial neural networks is challenging because significantly shallow and narrow networks do not work well while unnecessarily deep and wide networks require unrealistically large amount of training data to work. The use of dropout can work well for regularizing over-complete networks to prevent overfitting. A stochastic depth method using higher dropouts at deeper layers can self-organize the effective size of network depths for too deep neural networks. However, determining the size of network widths still requires designer's trial-and-errors.

To that end, there is a need to develop a neural network system and a method of designing neural networks for achieving flexible regularization and adaptable dimensionality reduction.

SUMMARY

In accordance with some embodiments of the present invention, a system for flexible regularization and adaptable scaling of an artificial neural network is provided. The system includes a memory to store an artificial neural network and training data; a processor and interface to submit signals and training data into the neural network, comprising a sequence of layers, each layer includes a set of neuron nodes, wherein a pair of nodes from neighboring layers are mutually connected with a plural of trainable parameters to pass the signals from the previous layer to next layer; a random number generator to modify the output signal of each neuron nodes for regularization in a stochastic manner following a multi-dimensional distribution across layer depth and node width directions of the neural network, wherein at least one layer has non-identical profile across neuron nodes; a training operator to update the neural network parameters by using the training data such that the output of neural network provides better values in a plural of objective functions; and an adaptive truncator to prune the output of neuron nodes at each layer in a compressed size of the neural network to reduce the computational complexity on the fly in downstream testing phase for any new incoming data.

The invention provides a method to design rateless AEs that enable flexible dimensionality reduction. The method is based on the recognition that the traditional PCA has a rateless property that refers capability to adjust any dimensionality by just appending or dropping sorted principal components. The method and system in this invention use a stochastic bottleneck architecture that employs non-uniform dropouts to create ordered latent variables. Specifically, an overcomplete artificial neural network is trained with non-uniform regularization within each layer to prioritize upper hidden nodes for learning the most dominant features at such middle layer.

Unlike traditional AE which has a deterministic bottleneck at a middle layer, some embodiments of the proposed architecture use a probabilistically pruned bottleneck to achieve adaptable dimensionality reduction. This allows end-users to freely adjust the computational complexity. The invention also provides an embodiment to realize this rateless property by a specific dropout mechanism called tail dropping, which drops consecutive neurons at the tail of the latent space, according to specific probability distributions. Some embodiments also describe architectures integrating linear PCA into nonlinear AE to offer better performance. The invention enables the end-user to flexibly change the dimensionality while achieving excellent distortion performance across the entire range of dimensionalities.

Some embodiments of nonuniform regularization use monotonically increasing dropout rates across hidden nodes at a middle hidden layer, that enables effective downsizing of over-parameterized neural networks. Yet another embodiment uses nonuniform dropout rates across depth direction as well as width direction using multi-dimensional dropout rate profile so that over-parameterized depth and width are effectively reduced without specifying those hyper-parameters deterministically. The method and system enable flexible adjustment of the neural network depth and width parameters without re-training for specific sizes.

Some embodiments use dropout over consecutive neuron nodes at once with a certain dropout rate. Some embodiments use a regularization technique called tail dropping, where the consecutive neuron nodes are dropped at random from one node to the last node. Yet another embodiment drops neuron nodes at once in multiple dimensions, e.g., two-dimensional (2D) bottom dropping across depth and width directions.

Some embodiments use dropout distribution optimized across depth and width or channel direction in the sense of multi-objective optimization. The distribution profile can be parametric with a few hyper-parameters specifying 2D dropout rates, e.g., exponential, Lorentz, polynomial, sigmoid, power, geometric, Poisson, or Wigner distributions. This enables small distortion when the users would prune the neuron nodes at any middle layers regardless of the number of pruning nodes. This capability of downsizing-ready neural networks can reduce the computational complexity for any downstream use cases.

Some embodiments use a variational principle with random sampling at middle layer so that the users can use the generative model. The method is compatible to employ fully-connected layer, convolutional layer, pooling/unpooling layer, skip connection, loopy feedback, recurrent feedback, inception module, semi-supervised conditioning and so on. Another embodiment uses random noise injection with non-uniform variances across width and depth as alternative regularizations to dropout regularizations.

Some embodiments use mean-square error (MSE) for minimizing loss function of the stochastic bottleneck neural networks. For a more perceptual loss function, structural similarity (SSIM) can be used alternatively. The objective function may also include a combination of cross entropy, negative log-likelihood, absolute error, cross covariance, clustering loss, KL divergence, hinge loss, Huber loss, negative sampling and triplet loss. Data-centric perceptual loss can be measured with adversarial training with learned generative models. For classification tasks, cross-entropy loss function is used. Multi-task optimization using multiple loss functions is also applied. In some embodiments, swapping out which complementary drops neurons towards two distinct branches is employed so that non-deterministic soft disentanglement is achieved. Yet another embodiment, multiple different profiles for dropout rates are used for common neuron nodes and survived neuron outputs are fed into multiple branches of neural networks, e.g., using monotonically increasing profile for the first branch, monotonically decreasing profile for the second branch and sinusoidal profile for the last branch to enable specific priority in latent variable for different domain.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1(c) shows a concept of Stochastic Width, where the dropout rate is non-identical, e.g., progressively increasing across the width of the network, according to embodiments of the present invention;

FIG. 2(b) is an illustration indicating a Stochastic Width regularization (Independent), having independently non-identical distribution of dropout rates, according to embodiments of the present invention;

FIG. 2(c) shows an embodiment of Stochastic Width regularization (Tail Drop), with tail dropping for realizing non-uniform dropout rates, according to embodiments of the present invention;

FIG. 2(d) shows examples of trial drop distributions, according to embodiments of the present invention;

DETAILED DESCRIPTION

Figures 1A, 1B:
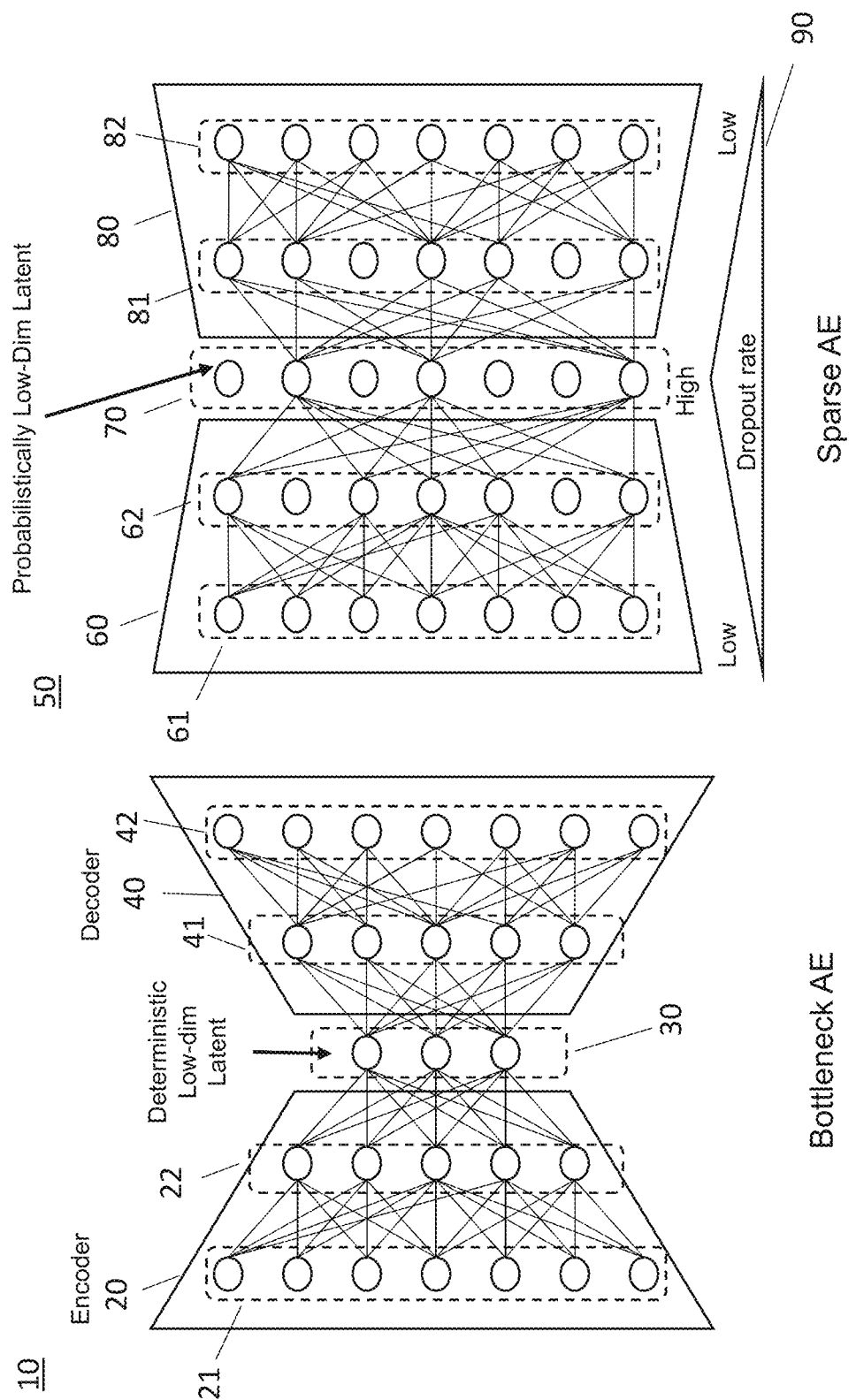
FIG. 1(a) shows a conventional AE architecture that cascades two deterministic neural networks, an encoder and a decoder, with a bottleneck architecture, i.e., smaller number of neuron nodes at the middle layer.
FIG. 1(b) shows a sparse AE architecture of a related art.

FIG. 1(a) shows a conventional AE (prior art) architecture 10, that employs two deterministic neural networks, an encoder 20 and a decoder 40, with a bottleneck architecture. The encoder feeds original data such as digital video signals at the input layer 21, and produces a reduced-dimension latent variables 30 through hidden layer 22. The decoder feeds the latent variable 30 to reproduce the data at output layer 42 through hidden layers 41. The width of the network narrows into a bottleneck between the encoder and decoder, more specifically the number of neuron nodes at middle latent layer is relatively smaller than the input layer and output layer. This enables forcing the networks learn to transform the data to lower-dimensional latent space (represented by the variables at the bottleneck) 30 and then reconstruct the data from the lower-dimensional representation.

Among all, AE has shown its high potential to learn lower-dimensional latent variables required in the nonlinear manifold underlying the datasets. AE is an artificial neural network having a bottleneck architecture as illustrated in FIG. 1(a), where N-dimensional data is transformed to M-dimensional latent representation (for $M \leq N$) via an encoder network, i.e., the number of nodes at the input and output layers is N and that at middle layer 30 is M. The latent variables should contain sufficient feature capable of reconstructing the original data through a decoder network.

The AE is often used as an un-supervised learning application where the data has no specific labeling to analyze but the users wish to learn an underlying representation. Once encoder and decoder networks learned, the decoder network is also useful to synthetically generate virtual data whose distribution is close to the real-world data. In order to generate random synthetic data, the latent node 30 often uses the variational principle, where the latent variable indicates parameter values specifying distribution of random number generators, e.g., its mean and variance for normal distribution.

From the original data $x \in R^N$, the corresponding latent representation $z \in R^M$, with a reduced dimensionality M is generated by the encoder network as $z=f_\theta(x)$, where $\theta$ denotes the encoder network parameters, i.e., weights, bias and any such learning variables in the encoder network. The latent variables should adequately capture the statistical geometry of the data manifold, such that the decoder network can reconstruct the data as $x'=g_\varphi(z)$, where $\varphi$ denotes the decoder network parameters and $x' \in R^N$. The encoder and decoder pair $(f_\theta, g_\varphi)$ are jointly trained to minimize the reconstruction loss (i.e., distortion), as given by:

$$\min_{\theta,\phi} \mathbb{E}_{x \sim Pr(x)} [\mathcal{L}(x, g_\phi(f_\theta(x)))]$$

where the loss function L(x, x') is chosen to quantify the distortion (e.g., MSE and SSIM) between x and x'. The neural network is updated, e.g., by stochastic gradient descent, adaptive momentum, Ada gradient, Ada bound, Nesterov accelerated gradient, or root-mean-square propagation.

By analogy, AEs are also known as nonlinear PCA (NLPCA), which is justified below. If we consider a simplified case where there is no nonlinear activation in the AE model, then the encoder and decoder functions will reduce to simple affine transformations. Specifically, the encoder becomes $f_\theta(x)=Wx+b$ where trainable parameters $\theta$ are the linear weight $W \in R^{M \times N}$ and the bias $b \in R^M$. Likewise, the decoder becomes $g_\varphi(z)=W'z+b'$ with $\varphi=\{W', b'\} \in \{R^{N \times M}, R^N\}$. If the distortion measure is MSE, then the optimal linear AE coincides with the classical PCA when the data follows the multivariate Gaussian distribution according to the Karhunen-Loève theorem.

To illustrate for example, assume Gaussian data x~Normal(m, C) with a mean $m \in R^N$ and covariance $C \in R^{N \times N}$, which has an eigen-decomposition: $C=\Phi\Lambda\Phi^T$, where $\Phi \in R^{N \times N}$ is the unitary eigenvectors matrix and $\Lambda=\text{diag}[\lambda_1, \lambda_2, \ldots, \lambda_N] \in R^{N \times N}$ is a diagonal matrix of ordered eigenvalues $\lambda_1 \geq \lambda_2 \geq \ldots \geq \lambda_N \geq 0$. For PCA, the encoder uses M principal eigenvectors $\Phi I_{N,M}$ to project the data onto an M-dimensional latent subspace with $W=I_{M,N}\Phi^T$ and $b=-Wm$, where $I_{M,N} \in R^{M \times N}$ denotes the incomplete identity matrix with diagonal elements equal to one and zero elsewhere. The decoder uses the transposed projection with $W'=\Phi I_{N,M}$ and $b'=m$. The MSE distortion is given by $$\mathcal{I}_M = \mathbb{E}_x \left[\|W'(Wx+b)+b'-x\|^2\right] = \sum_{n=M+1}^{N} \lambda_n$$

Since the eigenvalues are sorted, the distortion gracefully degrades as principal components are removed in the corresponding order. Of course, the MSE would be considerably worse if an improper ordering (e.g., reversed) is used.

One of the benefits of classical PCA is its graceful rateless property due to the ordering of principal components. Similar to rateless channel coding such as fountain codes, PCA does not require a pre-determined compression ratio M/N for dimensionality reduction (instead it can be calculated with full dimensionality as M=N), and the latent dimensionality can be later freely adjusted depending on the downstream application. More specifically, the PCA encoder and decoder learned for a dimensionality of M can be universally used for any lower-dimensional PCA of latent size $L \leq M$ without any modification of the PCA model but simply dropping the least-principal D components (D=M–L) in $z=[z_1, z_2, \ldots, z_M]^T$, i.e., nullifying the tail variables as $z_m=0$ for all $m \in \{L+1, \ldots, M\}$.

The rateless property is greatly beneficial in practical applications since the optimal latent dimensionality is often not known beforehand. Instead of training multiple encoder and decoder pairs for different compression rates, one common PCA model can cover all rates L/N for $1 \leq L \leq M$ by simply dropping tailing components, while still attaining the optimal distortion. For example, a data server could release a massively high-dimensional dataset alongside a trained PCA model with a reduced-dimensionality of M targeted for a specific application. However, for under various other applications (e.g., different analysis), an even further reduced dimensionality may suffice and/or improve learning performance for the ultimate task. Even for end-users that require fewer latent variables in various applications, the optimal rate-distortion tradeoff (under Gaussian data assumptions) is still achieved, without updating the PCA model, by simply discarding the least-principal components.

Nevertheless, the traditional PCA often underperforms in comparison to nonlinear dimensionality reduction techniques on real-world datasets. Exploiting nonlinear activation functions such as rectified linear unit (ReLU) or sigmoid, AEs can better learn inherent nonlinearities of the latent representations underlying the data. However, existing AEs do not readily achieve the rateless property, because the latent variables are generally learned to be equally important. Hence, multiple AEs would need to be trained and deployed for different target dimensionalities. This drawback still holds for the progressive dimensionality reduction approaches employed by stacked AEs and hierarchical AEs, those of which require multiple training and re-tuning for different dimensionality. This invention provides an effective method employing a stochastic bottleneck to realize rateless AEs that are adaptable to any compression rates.

FIG. 1(b) show another prior-art using stochastic pruning of AE architecture called sparse AE (SAE) 50, where instead of using deterministic networks, the encoder and decoder are randomized with dropout using a random number generator 436, some nodes are randomly set to zero during computation through the network. Unlike a conventional AE with a deterministic bottleneck architecture, the SAE employs a probabilistic bottleneck with an effective dimensionality that is stochastically reduced by dropout. For example, the SAE encoder generates M-dimensional variables z which are randomly dropped out at a common probability of p, resulting in an effective latent dimensionality of L=(1−p)M. Although, the number of nodes at each layer are kept fixed (not applying a deterministic bottleneck), the effective width of the network is progressively and stochastically narrowed by increasing the dropout rates 90 for the layers closer to the central latent variable layer 70. The main benefit of dropouts is to prevent overfitting issues for over-complete neural networks. Once randomly dropped, the computational complexity is also reduced. Although the SAE has better adaptability than deterministic AE to further dimensionality reduction by dropping latent variables, the latent variables are still trained to be equally important for reconstruction of the data, and thus it is limited in achieving flexible ratelessness.

Several prior-arts of AE variants including conventional AE in FIG. 1(a) and SAE in FIG. 1(b), variational AE (VAE), rate-distortion AE and compressive AE do not lend itself well to ratelessness, which is the ability to flexibly further reduce the dimensionality of the latent representation, since all of the latent variables are essentially equally important for data reconstruction. When some components of the latent representation are dropped, the reconstruction performance rapidly degrades.

Hence, in our invention, as illustrated in FIG. 1(c), a system introduces the concept of stochastic bottleneck, where the dropout rate is progressively increased across the width of the network 140 besides across the depth direction 141. This is specifically applied to the latent variable layer 120, with the effect of the prioritizing the latent variables with the lowest dropout rates. These components are the most-principle latent variables, in a manner analogous to the most-principle components of the linear dimensionality reduction of PCA. The components with the highest dropout rates are the least-principle nonlinear latent variables. This will allow a user to employ the learned AE model as a flexible dimensionality reduction method. They can apply the encoder on data to generate a latent representation, and then flexibly drop components starting from the least-principle latent variables. This gracefully degrades the data reconstruction performance, while using one learned AE model for adaptable dimensionality reduction, while achieving distortion comparable to conventional AE models fine tuned to the particular desired dimensionality.

The method and system of the invention provides a new AE family which do not have to determine the size of bottleneck architecture to realize the rateless property for seamless dimensionality reduction. The method can be viewed as an extended version of SAE, similar in its over-complete architecture, but also employing a varying dropout distribution across the width, depth or channel of the network. This aspect of our approach is key for achieving nearly optimal distortion while allowing a flexibly varying compression rate for the dimensionality reduction.

Figure 1D:
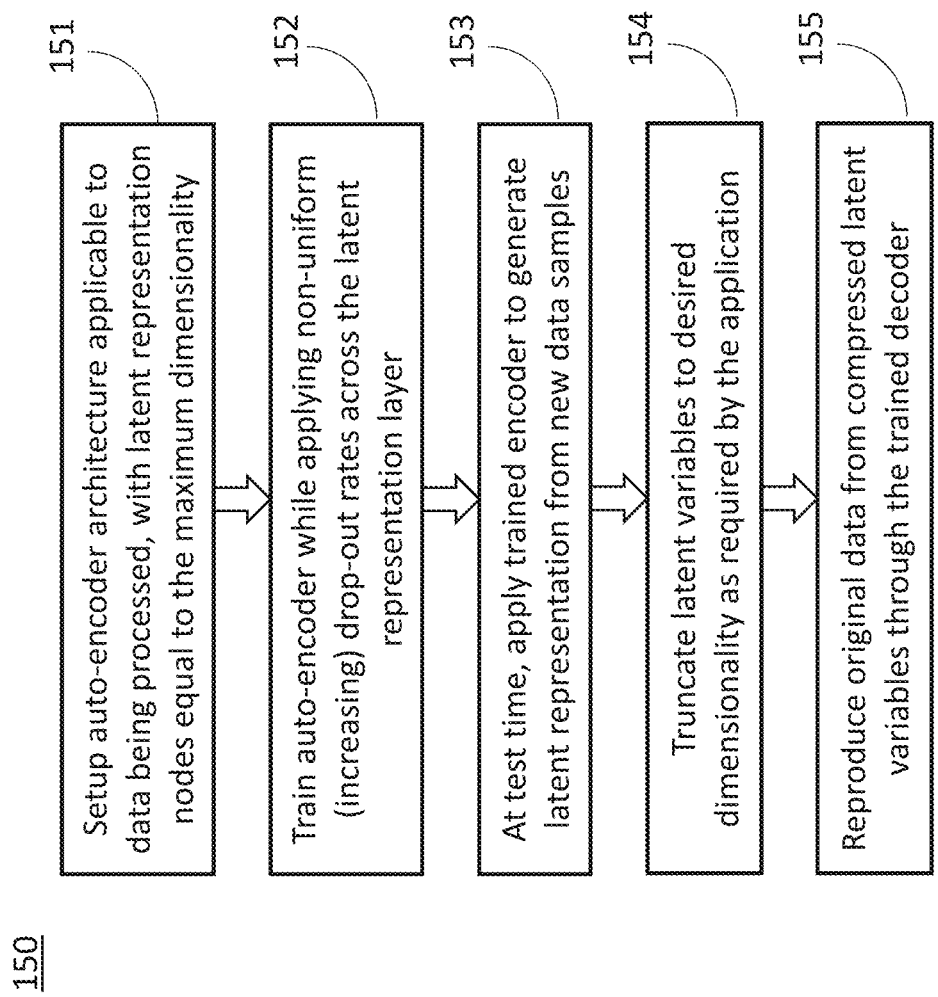
FIG. 1(d) is an example of a flowchart indicating the steps of a flexible dimensionality reduction method, according to embodiments of the present invention.

FIG. 1(d) shows an example of a flowchart indicating the steps of a flexible dimensionality reduction method, according to embodiments of the present invention. First, the method uses an auto-encoder architecture applicable to data being processed, with latent variable size equal to the maximum dimensionality 151. Next, the method trains the auto-encoder while applying non-uniform dropout rates across the width and depth directions at middle layers, at least including the latent representation layer 152. Then, the method applies the trained encoder to generate low-dimensional latent representation for any new incoming data samples 153. For downstream application, an adaptive truncator 435 for each user in the system can adaptively truncate latent variables to a desired dimensionality for further compression as required by each application 154. This makes it possible to reduce computational complexity. Finally, applying the trained decoder the original data are reproduced without causing much distortion from the compressed latent variables 155.

Some embodiments use the variational principle with a random distribution at middle layer so that the users can use generative model. The method of the present invention is compatible to employ fully-connected layer(s), convolutional layer(s), skip connection(s), loopy feedback, recurrent feedback, inception module(s), and semi-supervised conditioning. Another embodiment uses random noise injection with non-uniform variances across width and depth as alternative regularizations to dropout regularizations.

Stochastic Bottleneck Realization

The method of the invention employs a stochastic bottleneck that imposes a nonuniform dropout rate distribution that varies across both the width, depth and channel direction of the network, as shown in FIG. 1(c). In some embodiments, the probabilistic bottleneck is realized with a stochastic width method which employs a monotonically increasing dropout rate from the head (upper) latent variable neuron nodes to the tail (lower) nodes in order to enforce the latent variables to be ordered by importance, in a manner analogous to the PCA. By concentrating more important features in the head nodes, the method will enable adequate data reconstruction even when some of the least important dimensions (analogous to least-principal components) are later discarded by the other users in the downstream system.

The dropout technique itself has been widely used to regularize over-parameterized deep neural networks. The role of dropout is to improve generalization performance by preventing activations from becoming strongly correlated, which in turn leads to over-training. In the standard dropout implementation, network activations are discarded (by zeroing the activation for that neuron node) during training (and testing for some embodiments) with independent probability p. A recent theory provides a viable interpretation of dropout as a Bayesian inference approximation.

In some embodiments, the method and system of the present invention adopt some other related regularization methods; e.g., DropConnect, Drop-Block, StochasticDepth, DropPath, ShakeDrop, SpatialDrop, ZoneOut, Shake-Shake regularization, and data-driven drop in addition to regular dropout. In order to facilitate the rateless property for stochastic bottleneck AE architectures, yet another embodiment introduces an additional regularization mechanism referred to as TailDrop, as one realization of StochasticWidth.

Figure 2A:
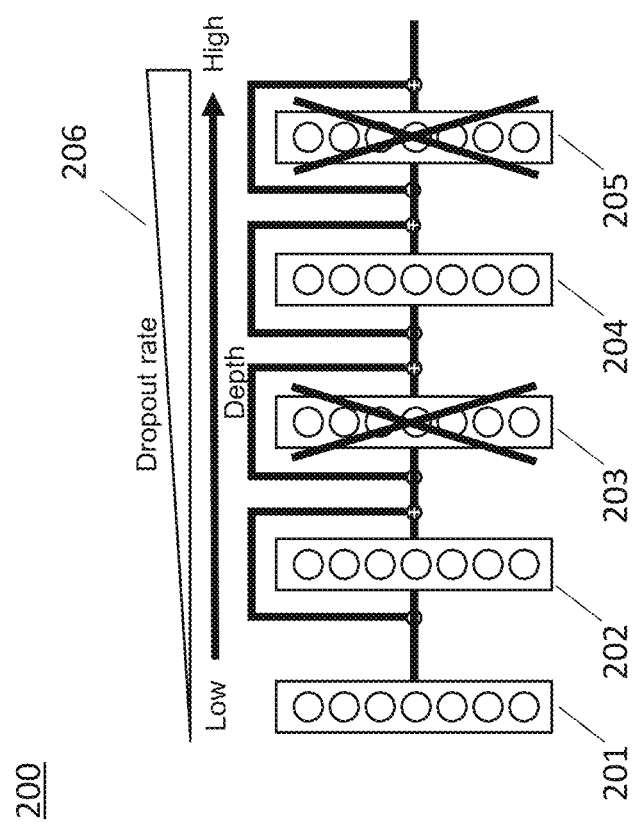
FIG. 2(a) illustrates a conventional (prior art) approach over increasing dropout rate across the depth of the layers for self-adjustment of network depth.

FIGS. 2(a)-2(d) further illustrates the concept of Stochastic Width and some particular embodiments referred to as Tail Drop. The stochastic bottleneck uses non-uniform dropout to adjust the importance of each neuron as explained in FIG. 1(c). This regularization technique is an extended version of StochasticDepth used in deep residual networks. As illustrated in FIG. 2(a), the prior-art StochasticDepth drops out entire layers at a higher chance 206 for deeper layers so that an effective network depth is constrained and shallower layers are dominantly trained. Analogously but differently from the StochasiticDepth in depth direction, non-uniform dropouts with monotonically increasing rate 212 are carried out across the width direction 211 for StochasticWidth of the present invention as shown in FIG. 2(b), where independent dropouts at increasing rates are used for each neuron in the same middle layer. In some embodiments, the monotonically increasing dropout rates can be also realized by dropping consecutive nodes at the tail 223 as shown in FIG. 2(c), which we call TailDrop. For TailDrop, the desired dropout rates can be achieved by adjusting the probability distribution of the tail drop length as depicted in FIG. 2(d), e.g., with Poisson, Laplacian, exponential, sigmoid, Lorentzian, polynomial, and Wigner distribution profiles. Under a model-based approach of nonlinear eigen-spectrum assumptions, some embodiments use the power cumulative distribution function $Pr(D<\tau M)=\tau^\beta$ for an order of $\beta \simeq 1$ ($\tau$ denotes a compression rate).

Figure 5:
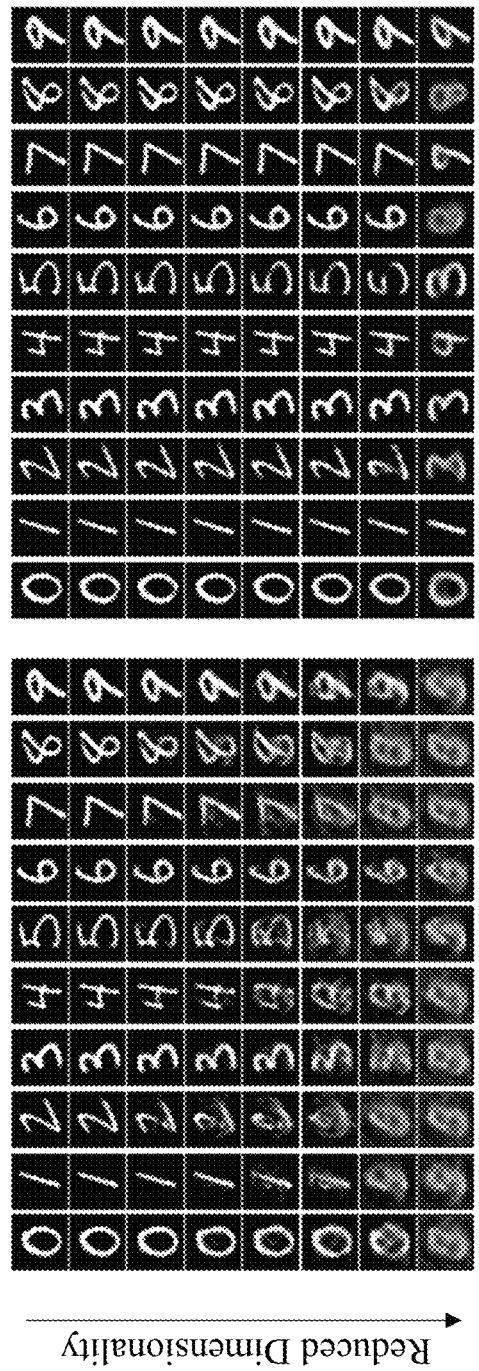
FIG. 5(a) shows an example of reconstructed images through deterministic sparse AE approach (prior art) for downstream dimensionality reduction.
FIG. 5(b) shows an example of reconstructed images through stochastic bottleneck AE approach for downstream dimensionality reduction, according to embodiments of the present invention.

FIG. 5(a) shows an example of reconstructed image data through conventional AE for a hand-written digit dataset. The conventional AE degrades the image quality when the users discard latent variables to be lower-dimensionality representation from 64 variables to 4 variables if the AE is trained at a deterministic bottleneck architecture. FIG. 5(b) shows a graceful performance of the invented stochastic bottleneck; the high-quality reconstructed images through the stochastic AE are preserved even when the dimensionality is reduced by the downstream users without the need of re-training.

Model-Embed Stochastic Bottleneck

Figure 3A:
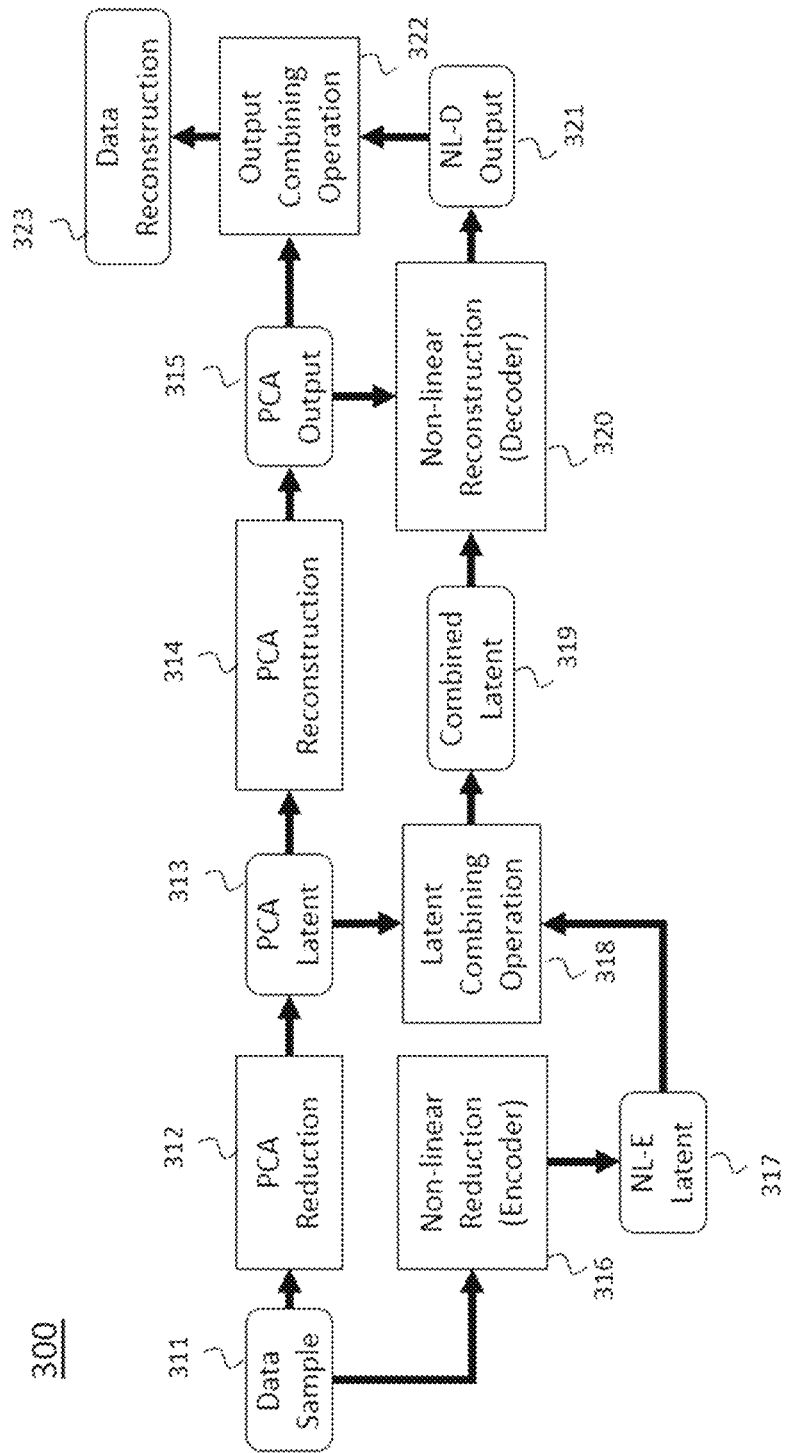
FIG. 3(a) shows a method for combining the non-linear AE method for flexible dimensionality reduction, according to embodiments of the present invention.
Figure 3:
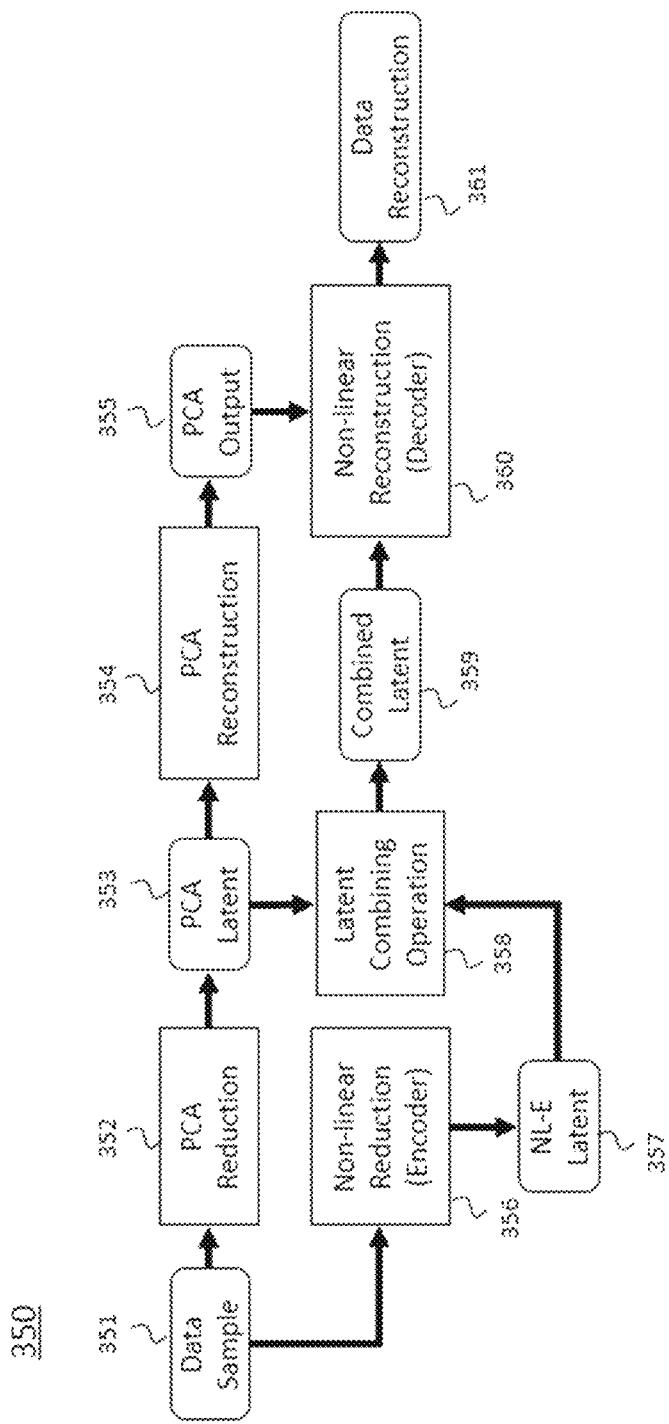
FIG. 3(b) shows a variation of FIG. 3(a), according to embodiments of the present invention.

FIG. 3(a) depicts a method for combining the non-linear AE method for flexible dimensionality reduction as described above with another model such as linear flexible dimensionality reduction known as PCA. The "Non-linear Reduction (Encoder)" module 316 corresponds to the encoder of the AE as described above, the "Non-linear Reconstruction (Decoder)" module 320 corresponds to the decoder of the AE as described above, and the "NL-E Latent" 317 refers to the latent variables output by the encoder.

The "PCA Reduction" 312 and "PCA Reconstruction" 314 are the standard projection and data reconstruction transformations learned by the standard PCA method, the "PCA Latent" 313 is the latent variable vector produced by the PCA projection transformation, and the "PCA Output" 315 is the data reconstruction produced by the PCA data reconstruction transformation. Along the top path of the diagram, the Data Sample is processed by the standard PCA reduction projection and reconstruction transformations, however the intermediate "PCA Latent" 313 and final "PCA Output" 315 are integrated into the bottom path, which processes the data with the stochastic AE.

In the bottom path, the data sample is processed by the "Non-linear Reduction (Encoder)" 316 to yield the "NL-E Latent" 317, however instead of directly feeding that into the "Non-linear Reconstruction (Decoder)" 320, the "NL-E Latent" is combined with the "PCA Latent" via "Latent Combining Operation" 318 (which, for example, could be an elementwise additive operation, product or concatenation) to yield the "Combined Latent" 319, which is then fed into the "Non-linear Reconstruction (Decoder)" 320. The "Non-linear Reconstruction (Decoder)" is also (optionally) modified to take the "PCA Output" 315 as an input, and produces the "NL-D Output" 321, which would normally correspond to a reconstruction of the data. However, in our procedure, the "NL-D Output" is then combined with the "PCA Output" via "Output Combining Operation" 322 (which, for example, could be an elementwise additive operation) to yield the final Data Reconstruction 323.

FIG. 3(b) depicts another variation upon the embodiment depicted in FIG. 3(a). Instead of combining the "NL-D Output" 321 with the "PCA Output" 315, the output of the "Non-linear Reconstruction (Decoder)" 360 is directly used as the final Data Reconstruction 361.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. A processor may be implemented using circuitry in any suitable format.

Figure 4:
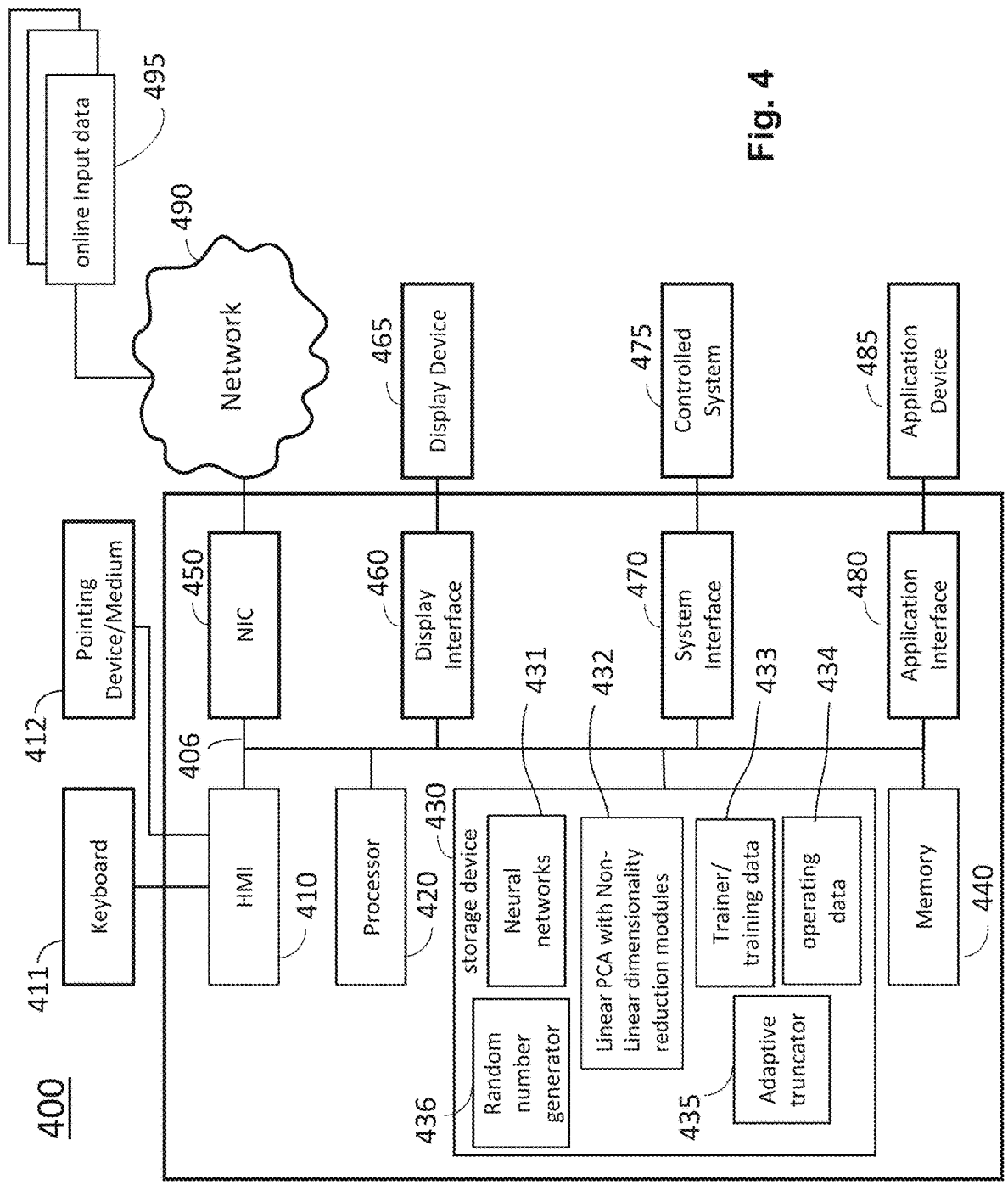
FIG. 4 shows an embodiment of the system according to the present invention.

FIG. 4 shows a block diagram of an apparatus 400 for controlling a system including a plurality of sources of signals causing a plurality of events in accordance with some embodiments. An example of the system is a manufacturing production line. The apparatus 400 includes a processor 420 configured to execute stored instructions, as well as a memory 440 that stores instructions that are executable by the processor. The processor 420 can be a single core processor, a multi-core processor, a computing cluster, or any number of other configurations. The memory 440 can include random access memory (RAM), read only memory (ROM), flash memory, or any other suitable memory systems. The memory 440 is configured to load the computer executable instructions (programs) stored in a storage device 430 in the apparatus 400, and the processor 420 execute the computer executable instructions. The storage device 430 includes the computer executable instructions including neural networks 431, a linear PCA 432, trainer/training data 433, operating data 434, an adaptive truncator 435, and a random number generator 436. The processor 420 is connected through a bus 406 to one or more input and output devices.

These instructions implement a method for detecting and/or diagnosing anomaly in the plurality of events of the system. The apparatus 400 is configured to detect objects anomalies using a neural network 431. Such a neural network is referred herein as a structure partially connected neural network. The neural network 431 is trained to diagnose a control state of the system. For example, the neural network 431 can be trained offline by a trainer (training operator) 433 using training data to diagnose the anomalies online using the operating data 434 of the system.

Examples of the operating data include signals from the source of signals collected during the operation of the system, e.g., events of the system. Examples of the training data include the signals from the source of signals collected over a period of time. That period of time can be before the operation/production begins and/or a time interval during the operation of the system.

Multi-Task and Adversarial Learning with Adaptable Scaling

The above embodiments focused on AE architecture for un-supervised learning for dimensionality reduction when the dataset have redundancy without labeling. For this purpose, the stochastic AE is trained to minimize a distortion measure, including but not limited to mean-square error (MSE) or structural similarity (SSIM). Some embodiments use adversarial training to minimize more perceptual distortion such that the decoder output is hard to be distinguished from the original data.

Figure 6:
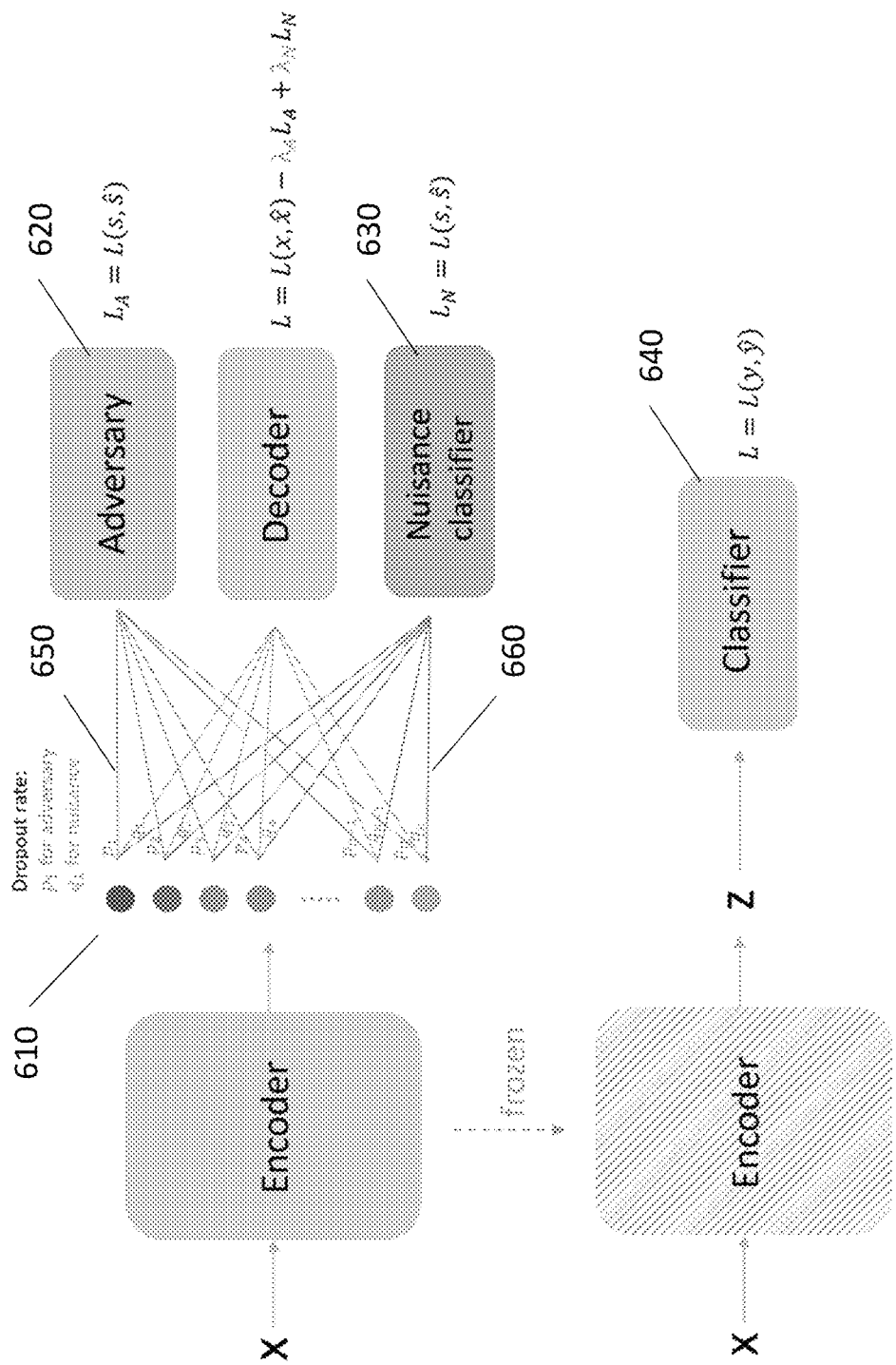
FIG. 6 shows an embodiment of complementary dropout for soft-disentangled latent representations specified for different objective functions, according to embodiments of the present invention.

Yet another embodiment uses multiple objective functions to train the stochastic AE given conditional labeling and nuisance variables. This method of invention stochastically disentangle latent variables, e.g., the surviving head neuron nodes are fed into one decoder network to maximize the SSIM, while the complementary tail neuron nodes are fed into other decoder network to minimize MSE to nuisance variables. FIG. 6 shows an example of this embodiment, where the encoder generates latent variables 610 which are non-uniformly dropped in random. The surviving latent variables 650 go to one neural network for adversary classifier 620, while the rest of dropped latent variables 660 are fed into another neural network for nuisance classifier 630. This method of non-uniform complementary dropout is called SwapOut, which enables more interpretable latent variables and flexible construability for the users to adjust tradeoff between distortion and transferability through soft disentanglement. The softly disentangled latent variables 610 are later pruned using the adaptive truncator 435 by the user and used for other neural network 640 for different task in test phase with a high transferability. For some embodiments, multiple different dropout profiles having non-isotropic functions are used for specific loss functions to disentangle the neuron nodes at middle layers.

Some embodiments of the present invention use the stochastic width in more general neural network applications such as image classification and data regression. Specifically, no decoder block or bottleneck is necessary. For regular feed-forward multi-layer perceptron architectures, the stochastic width is used at each layer so that the users can adaptively change the network size after training. This can solve the issue of current neural network design which requires pre-determination of network size, i.e., neuron size (width), layer size (depth) and channel. The non-uniform dropout rates at each layer over depth and width direction enables adaptable scaling of network size without the knowledge of best network size. The system can consider very deep and wide networks in training phase, and then the user in the system can adaptively down-size the network architecture in later testing phase for classification or regression applications.

Yet another embodiment, the tail dropping is applied at adjacent layers simultaneously, which is called SideDrop. The profile to determine the boundary of dropping neurons across layer is designed in 2D or 3D continues function profiles such as polynomial functions.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, the present invention provides a new method and system realizing rateless auto-encoders that enable a flexible latent dimensionality, which can be seamlessly adjusted for varying distortion and dimensionality requirements. In the proposed invention, instead of a deterministic bottleneck architecture, we use an over-complete representation that is stochastically regularized with non-identical dropouts. Unlike prior arts, our neural networks employ multi-dimensional non-uniform dropout rates across the network width, channel and depth such that the neuron nodes become sorted by importance. The method with stochastic bottleneck framework enables seamless rate adaptation with high reconstruction performance, without requiring optimization of predetermined latent dimensionality at training. In some embodiments, the method of non-uniform regularization is applied for data classification or regression with multiple different objective functions for multi-task and adversarial learning. The method can allow adaptable scaling the size of generic artificial neural networks, i.e., the depth and width are self-adjusted in training phase and the trained network with non-uniform regularization is seamlessly down-sized by the downstream user to reduce the computational complexity in testing phase.

Use of ordinal terms such as "first" and "second" in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for flexible regularization and adaptable scaling of an artificial neural network, comprising:
   an interface configured to receive and submit signals;
   a memory to store an artificial neural network and training data, a linear PCA, a training operator, an adaptive truncator and a random number generator;
   a processor, in connection with the interface and the memory, configured to submit the signals and training data into the artificial neural network including a sequence of layers, wherein each layer includes a set of neuron nodes, wherein a pair of neuron nodes from neighboring layers are mutually connected with a plural of trainable parameters to pass the signals from the previous layer to next layer, wherein the processor executes:
   the random number generator configured to modify output signals of each of the neuron nodes for regularization in a stochastic manner following a multi-dimensional distribution across layer depth and node width directions of the artificial neural network, wherein at least one layer has non-identical profile across neuron nodes, wherein a combination of dropout, swap out, zone out, block out, drop connect, noise injection, side dropping, tail dropping, and shaking is employed with the random number generator;
   the training operator configured to update the artificial neural network parameters by using the training data such that an output of the artificial neural network provides better values in a plural of objective functions; and
   the adaptive truncator configured to prune outputs of the neuron nodes at each layer in a compressed size of the artificial neural network to reduce computational complexity in downstream testing phase for any new incoming data.

2. The system of claim 1 wherein the neural network comprises cascaded multiple blocks of neural networks forming at least encoder network and decoder network, wherein a stochastic bottleneck having smaller number of neurons at least in one middle layer to represent adaptable low-dimensional latent variables with non-identical dropout rates across the node, enabling a rateless feature extraction by the encoder network and flexible data reconstruction by the decoder network.

3. The system of claim 2, wherein the node outputs are randomly dropped according to a monotonically increasing dropout rate profile through stochastic truncation of the lower tail segment of consecutive nodes at once, whereas the upper head segment of consecutive nodes are kept survived for training the parameters of neural networks.

4. The system of the claim 3, wherein the dropped nodes and survived nodes are complementary fed into individual neural networks to seamlessly disentangle the extracted feature such that the upper nodes and lower nodes have different importance in two objective functions for multi-task and adversarial optimization, enabling transferable latent representations.

5. The system of the claim 2, wherein the encoder network and decoder network integrate linear projection feature extraction with linear principal component analysis (PCA) encoder and decoder to enable model-assisted adaptable dimensionality reduction.

6. The system of claim 2, wherein variational random sampling is employed to construct a generative model.

7. The system of the claim 1, wherein the network depth and width are adaptively scaled by stochastic depth and width, wherein deeper and wider layers are dropped at a higher probability in training, enabling downstream systems to adjust the size of neural network without re-training.

8. The system of claim 1, wherein a combination of multiple parametric functions based on polynomial, exponential, power, Poisson, Wegner, and Laplacian functions is employed with a certain weight to specify the multi-dimensional regularization profile across network depth and width.

9. The system of claim 1, wherein a combination of convolutional layer, recurrent feedback, loopy connection, skip connection, inception, and activation is employed.

10. The system of claim 1, wherein a combination of mean-square error, cross entropy, structural similarity, negative log-likelihood, absolute error, cross covariance, clustering loss, divergence, hinge loss, Huber loss, negative sampling and triplet loss is employed.

11. The system of claim 1, wherein the training operator employs a combination of stochastic gradient descent, adaptive momentum, Ada gradient, Ada bound, Nesterov accelerated gradient, and root-mean-square propagation for optimizing the trainable parameters of the neural network.

12. A system for flexible regularization and adaptable scaling of an artificial neural network, comprising:
an interface configured to receive and submit signals;
a memory to store an artificial neural network and training data, a linear PCA, a training operator, an adaptive truncator and a random number generator, wherein the neural network comprises cascaded multiple blocks of neural networks forming at least encoder network and decoder network, wherein a stochastic bottleneck having smaller number of neurons at least in one middle layer to represent adaptable low-dimensional latent variables with non-identical dropout rates across the node, enabling a rateless feature extraction by the encoder network and flexible data reconstruction by the decoder network;
a processor, in connection with the interface and the memory, configured to submit the signals and training data into the artificial neural network including a sequence of layers, wherein each layer includes a set of neuron nodes, wherein a pair of neuron nodes from neighboring layers are mutually connected with a plural of trainable parameters to pass the signals from the previous layer to next layer, wherein the processor executes:
the random number generator configured to modify output signals of each of the neuron nodes for regularization in a stochastic manner following a multi-dimensional distribution across layer depth and node width directions of the artificial neural network, wherein at least one layer has non-identical profile across neuron nodes;
the training operator configured to update the artificial neural network parameters by using the training data such that an output of the artificial neural network provides better values in a plural of objective functions; and
the adaptive truncator configured to prune outputs of the neuron nodes at each layer in a compressed size of the artificial neural network to reduce computational complexity in downstream testing phase for any new incoming data.

13. A system for flexible regularization and adaptable scaling of an artificial neural network, comprising:
an interface configured to receive and submit signals;
a memory to store an artificial neural network and training data, a linear PCA, a training operator, an adaptive truncator and a random number generator;
a processor, in connection with the interface and the memory, configured to submit the signals and training data into the artificial neural network including a sequence of layers, wherein each layer includes a set of neuron nodes, wherein a pair of neuron nodes from neighboring layers are mutually connected with a plural of trainable parameters to pass the signals from the previous layer to next layer, wherein the processor executes:
the random number generator configured to modify output signals of each of the neuron nodes for regularization in a stochastic manner following a multi-dimensional distribution across layer depth and node width directions of the artificial neural network, wherein at least one layer has non-identical profile across neuron nodes;
the training operator configured to update the artificial neural network parameters by using the training data such that an output of the artificial neural network provides better values in a plural of objective functions, wherein the training operator employs a combination of stochastic gradient descent, adaptive momentum, Ada gradient, Ada bound, Nesterov accelerated gradient, and root-mean-square propagation for optimizing the trainable parameters of the neural network; and
the adaptive truncator configured to prune outputs of the neuron nodes at each layer in a compressed size of the artificial neural network to reduce computational complexity in downstream testing phase for any new incoming data.

* * * * *